United States Patent
Nemiroff et al.

(10) Patent No.: US 6,961,384 B2
(45) Date of Patent: Nov. 1, 2005

(54) STILL PICTURE PROCESSING FOR MPEG-2 VIDEO

(75) Inventors: Robert S. Nemiroff, Carlsbad, CA (US); Robert J. Stone, Poway, CA (US)

(73) Assignee: General Instrument Corporation, Horsham, PA (US)

( * ) Notice: Subject to any disclaimer, the term of this patent is extended or adjusted under 35 U.S.C. 154(b) by 977 days.

(21) Appl. No.: 09/737,152

(22) Filed: Dec. 14, 2000

(65) Prior Publication Data

US 2002/0075399 A1 Jun. 20, 2002

Related U.S. Application Data

(60) Provisional application No. 60/171,773, filed on Dec. 22, 1999.

(51) Int. Cl.⁷ .................................................. H04N 7/12
(52) U.S. Cl. .............................. 375/240.26; 375/240.25
(58) Field of Search .................... 386/109; 375/240.25, 375/240.26, 240.13

(56) References Cited

U.S. PATENT DOCUMENTS

| | | | | | |
|---|---|---|---|---|---|
| 4,928,171 | A | * | 5/1990 | Kline | 348/64 |
| 5,724,475 | A | * | 3/1998 | Kirsten | 386/109 |
| 6,216,006 | B1 | * | 4/2001 | Scholefield et al. | 455/450 |
| 6,307,565 | B1 | * | 10/2001 | Quirk et al. | 345/554 |

* cited by examiner

*Primary Examiner*—Chris Kelley
*Assistant Examiner*—Patrick Cathey, II
(74) *Attorney, Agent, or Firm*—Robert P. Marley

(57) ABSTRACT

Still picture images are encoded and transmitted at reduced rates using the MPEG-2 standard. Video frames are captured for processing at a still picture capture rate that is lower than the video input frame rate. The captured frames are compressed as Intra frames at the input frame rate. Selected ones of the compressed frames are inserted in the MPEG-2 transport stream for communication to a decoder at a still picture repetition rate which is no less, in frames per second, than the capture rate.

26 Claims, 2 Drawing Sheets

STILL PICTURE PROCESSING FOR MPEG-2 VIDEO

This application claims the benefit of U.S. Provisional Patent Application No. 60/171,773, filed Dec. 22, 1999.

BACKGROUND OF THE INVENTION

The present invention relates to digital video, and more particularly to a scheme for enabling still picture sequences (sometimes referred to as "still frame" sequences) to be communicated at a very low bit rate (e.g., under 200 Kbps) in the same transport stream that is carrying full motion video, multimedia and/or audio services such as conventional television programming. The techniques of the invention are particularly suitable, e.g., in providing still pictures for weather channels, album covers (e.g., text and graphics) that may accompany music channels, real estate sales channels, home shopping channels, and the like. For example, the invention will enable the album cover of a music video to be displayed while the video is playing, with the album cover video information being provided at a reduced bit rate (and consequent savings in bandwidth) with respect to the full motion music video (i.e., "normal video").

One prior technique for providing still picture images in a digital television environment involves precompressing the still pictures, storing the precompressed frames, and then providing the stored precompressed frames for decompression and display when requested. This technique is not advantageous since it does not provide real-time processing of the frames and, as a result, requires additional hardware (such as a server) to store the precompressed files and deliver them when required.

Another prior art technique is that used in the Digicipher® II digital television system developed by General Instrument Corporation of Horsham, Pa., U.S.A. In this system, video frames are normally compressed as Predictive (P) frames, and an Intra (I) frame is only processed when specifically requested by a syntax processor. In order to capture a still picture, the syntax processor instructs the video compressor to go into a still frame mode by setting a still frame mode flag. This causes the compressor frame buffer pointers to freeze, which in turn causes the same frame to be repeated. When a new frame is to be captured, the syntax processor first disables the still frame mode flag to the compressor, and the compressor returns to a normal video mode operation. To capture a new still picture, the still frame flag is set again. This sequence of operation adds complexity due to the requirement to set and re-set the still frame mode flag and to switch the compressor between P-frame and I-frame processing.

Accordingly, it would be desirable to provide simplified and less costly apparatus and methods for encoding and transmitting still picture images, and for transmitting such images at reduced frame and transmission rates, using the MPEG-2 or similar standard. It would be further advantageous to provide such apparatus and methods that can be implemented using a standard video compressor that operates in the same manner and using the same algorithms for both still pictures and normal video. It would be still further advantageous to provide such apparatus and methods that will operate with a conventional decoder, without the need for a special still frame decoder mode. Such a scheme would advantageously utilize the MPEG-2 "still picture mode" at the decoder.

An advantageous system as described above would provide a bandwidth efficient and cost effective solution to the communication of still picture images for digital television and the like. The present invention provides methods and apparatus having the aforementioned and other advantages.

SUMMARY OF THE INVENTION

A method and apparatus are provided which enable still picture images to be encoded and transmitted at a reduced frame repetition rate (e.g., no more than about $\frac{1}{15}$ to two frames per second) and a reduced transmission rate (e.g., about 100 Kbps–200 Kbps or less) using the Moving Picture Experts Group (MPEG-2) standard or other digital video standard.

In accordance with the invention, a standard video compressor processes still video frames in the same manner that conventional full motion video is compressed. In order to maintain a standard throughput for the video compressor (e.g., at an input video frame rate), while providing a reduced still picture repetition rate in the ultimate transport stream, a compressed video buffer (e.g., video FIFO) is provided to receive output from the video compressor. The compressed video buffer is gated (either at its input, its output, or both) to provide frames of compressed video data at the reduced still picture repetition rate.

In one embodiment, which is particularly useful when still pictures are captured from an input video stream at a "capture rate" that is less than the input video frame rate in frames per second, both "current frames" and "previous frames" are provided as input to the compressor, with the previous frames being provided on an ongoing basis between the provision of current frames. The current frames are provided at the still picture capture rate. The previous frames are frames that are originally received as current frames, and stored in a buffer for subsequent output as previous frames.

In an example embodiment, the still picture capture rate is between about one and five times the repetition period. For example, if the repetition period is one second, and the capture rate is three seconds, then one frame is sent every one second and a new still picture is captured every three seconds.

DETAILED DESCRIPTION OF THE INVENTION

Figure 1:
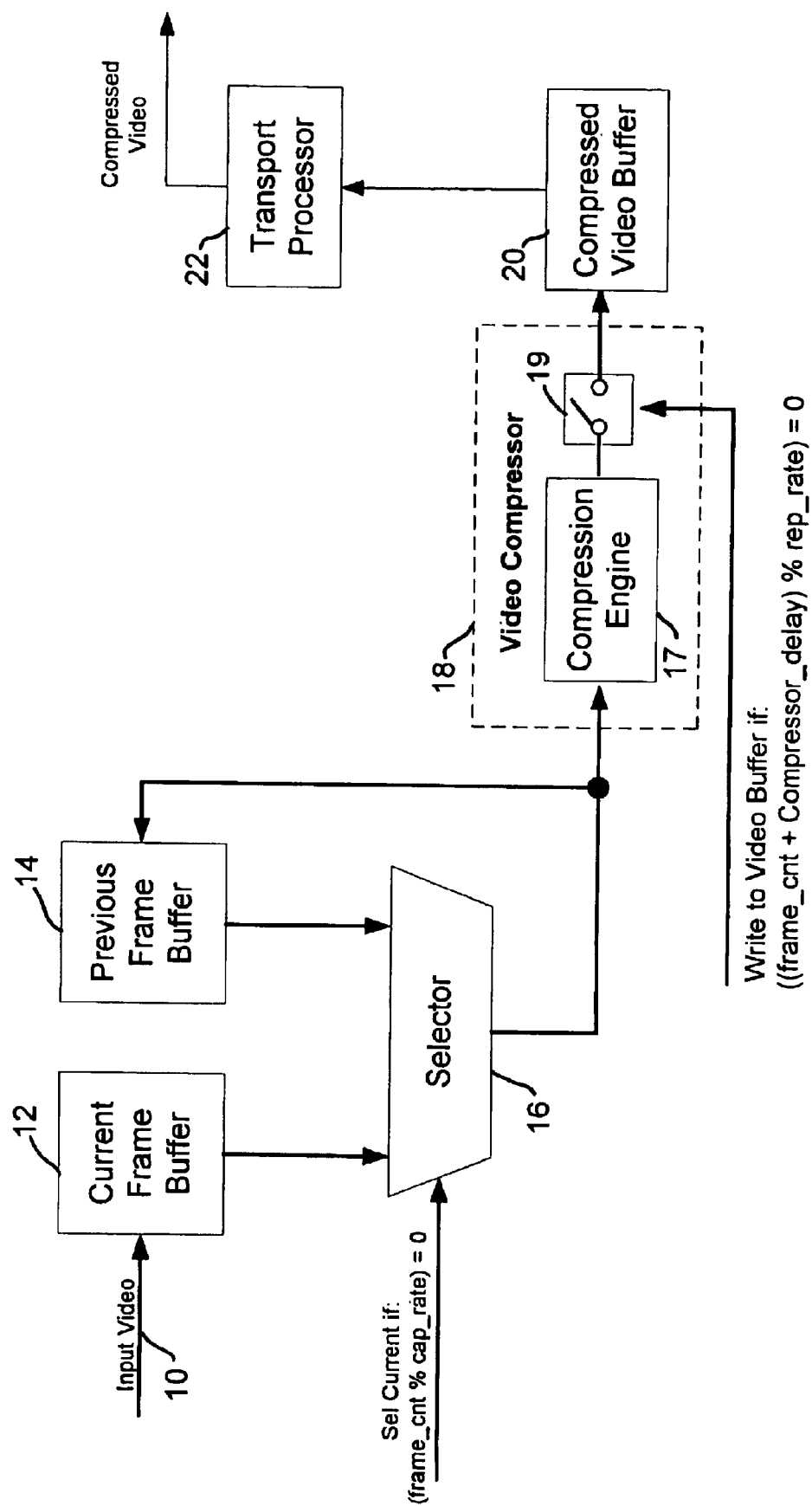
FIG. 1 is a block diagram illustrating a still picture encoder in accordance with the invention.

The present invention enables still picture sequences to be communicated at a very low bit rate. As used herein, such a low bit rate can comprise, for example, a bit rate on the order of about 100 to 200 Kbps, although the invention is not limited to any particular bit rate and is broad enough to encompass any desired bit rate that is low compared to that for normal (full motion) video. The invention is particularly well suited for digital television systems, and can be implemented, for example, in a standard (SDTV) or high definition television (HDTV) encoder.

In accordance with the invention, still pictures are trickled out of the encoder over a relatively long period of time. As a result, transmission bandwidth is saved. In particular, the still pictures are provided in a manner analogous to a slide show, instead of as real-time video. Thus, rather than dedicating a full bandwidth real-time video service to still images, the still pictures can be sent to a population of decoders on a reduced bandwidth channel at, e.g., only 100 to 200 Kbits per second. Packets of the still picture data are provided under their own program identifier (PID) within a conventional MPEG-2 transport stream.

In an MPEG-2 digital television application, an output bit rate on the order of about 100 to 200 Kbps translates to a video frame rate of about 1/10 to two frames per second, or a period of one-half to ten seconds per frame. As an example, an implementation may be provided where the longest period is ten seconds, assuming a rate of 100 Kbps, with a 1 Mbit output (i.e., compressed) frame size limitation (100 Kbps*10 sec.=1 Mbit). The MPEG MP@ML (main profile, main level) decoder has a 1.84 Mbit video buffer size. The decoder has about 1.5 frames in its video FIFO before it processes the frame, or 1.5 Mbits maximum buffer fullness at 100 Kbps, with a 10 second repetition rate.

Present day digital television encoders, such as the DigiCipher® II Plus encoder available from the Broadband Communications Sector of Motorola, Inc., Horsham, Pa. U.S.A., support still picture processing, whereby the user may wish to transmit still pictures at a low frame rate (e.g., 1/30 to two frames per second). The user selects the following three parameters:

1) Bit Rate (100 Kbps–200 Kbps),
2) Still picture Capture Rate (rate at which a new input still picture is captured), and
3) Still picture Repetition Rate (rate at which still pictures are output).

During normal operation, frames are compressed at 30, 29.97 or 24 frames/sec. using, e.g., the MPEG-2 compression standard. MPEG-2 processes frames as I, P, or B (Intra, Predictive, or Bidirectional) depending on input parameters, N (the Group-of-Pictures (GOP) length) and M (the number of frames between anchor frames (i.e., I or B frames)). If the bit rate selected is 200 Kbps or less, still picture processing is automatically selected.

With still picture processing in accordance with the present invention, the still pictures are encoded only as Intra (I) frames at the normal input frame rate of, e.g., 29.97 or 30 Hz (frames per second). However, not all of the encoded frames are transmitted to the decoder; only a subset of the encoded frames is transmitted at the still picture repetition rate, which is much lower than the input frame rate. Accordingly, still pictures are processed by the video compressor at the normal input frame rate, but communicated to the decoder at a much lower rate, such as 100 Kbps–200 Kbps.

After the decoder has appoximately 1.5 compressed still picture frames in its video buffer, or the decoder video buffer is otherwise filled to a predetermined level, the decoder is required to process and display the next frame at a time specified by the encoder via a Presentation Time Stamp (PTS). The PTS is chosen such that the entire frame will have entered the decoder buffer, and not too much data will arrive after this frame to cause the buffer to overflow. The criteria is not a predetermined buffer level, but a predetermined time. In the example implementation discussed above, a 1.5 frame times system delay was chosen to allow a degree of margin to prevent FIFO overflow or underflow.

The use of a PTS, and associated Display Time Stamp (DTS) is well known in the art. Once received and decoded, the decoder will continuously display a received still picture at the frame rate, until a new compressed still picture is received.

As illustrated in the still picture encoder of FIG. 1, still pictures from a still frame input video stream 10 are received and stored in a current frame buffer 12 at the normal input frame rate. The still frame input video stream 10 is carried under a specific PID within a standard transport stream. The normal input frame rate, at which the still pictures are provided in the video stream 10, is typically 29.97 or 30 frames per second, although different standards may now or in the future provide other rates. A selector 16, which can be implemented using a standard multiplexer, is provided to enable selection between the current frame data stored in buffer 12 and previous frame data stored in buffer 14, for input to a video compressor 18. In the illustrated embodiment, the video compressor includes a conventional video compression engine 17, and an output gate 19. The output gate is controlled, as described in greater detail below, in order to provide compressed still pictures to a compressed video buffer 20 at the desired frame repetition rate. It should be appreciated that the embodiment shown in FIG. 1 is only one possible implementation of the invention, and that other implementations will be apparent to those skilled in the art. For example, the gate 19 could be located on the output side of the buffer 20, with compressed still pictures being overwritten in the buffer until a desired compressed picture has been buffered for output.

Current still frames are captured from the current frame buffer at a "still picture capture rate" which is less than the input frame rate. Between successive current frame captures, previous frames are provided to the video compressor 18 from the previous frame buffer 14. The captured current still picture frames and stored previous frames are successively provided to the video compressor at the normal video frame rate, so that the compression engine 17 can operate without modification.

In the illustrated embodiment, the capture rate is converted to units of input frames, e.g., a frame capture period, wherein one frame is captured during each period. For example, if the converted capture rate (cap_rate) is ten frames, the current frame buffer 12 is selected once every ten input frame times. Otherwise, the previous frame buffer 14 is selected by selector 16. This is denoted by the mathematical expression frame_cnt % cap_rate, where "%" denotes the modulo operation, and frame_cnt is a count of all input frames. It should be appreciated that other implementations can be devised within the scope of the invention for controlling the selector 16.

All captured current frames and previous frames output by the selector 16 are compressed by the video compressor 18 as Intra frames. Therefore, MPEG-2 picture parameters N and M are set as: N=1, M=1 for the video sequence. Moreover, in order to maintain the operation of the video compression engine 17 the same for still pictures as for normal video, all of the frames provided to the compressor are compressed at the normal input frame rate. However, in the illustrated embodiment, only frames at a still picture repetition rate (rep_rate) are stored in the compressed video buffer 20 for subsequent output to a transport processor 22. The storage of frames at the rep_rate is controlled by gate 19 in response to a control signal which actuates the gate to write data into buffer 20 when ((frame_cnt+compressor_delay) % rep_rate)=0. The term "compressor_delay" accounts for the inherent processing delay of the compression engine 17.

Alternatively, all of the compressed frames from video compressor 18 can be written into compressed video buffer 20, with only a portion of those being delivered by the buffer to the transport processor 22. In either embodiment, the still picture repetition rate is the rate at which still pictures are communicated to the decoder. As indicated above, this rate (e.g., 100 to 200 Kbps) is much lower than the input frame rate at which the input video 10 is received by the current frame buffer 12. Even though the present invention allows the rate at which still frames are transmitted to the decoder to be much lower than the rate at which such frames are received by the encoder, the video compression engine 17 continues to operate at its standard speed.

In the illustrated embodiment, the still picture repetition rate is converted to units of input frames. For example, if the converted repetition rate is ten frames, e.g., a frame repetition period, one of every ten compressed pictures output from the compressor 18 is stored in the compressed video buffer, i.e., one picture every ten input frame times.

The frames stored in the compressed video buffer 20 are selected such that if the capture rate is a multiple of the repetition rate, a current frame captured at the input (e.g., by buffer 12) and selected by selector 12 is the same frame stored in the FIFO 20. This is useful if the input frame changes at a higher rate than the capture rate. When the input frame image changes at a higher rate than the capture rate, not all of the images will be transmitted. Instead, only the images captured at the capture rate will be transmitted.

The capture rate and the repetition rate can also be the same (i.e., capture rate=repetition rate). In this event, the video is encoded at the input frame rate but, unlike the normal MPEG-2 encoding process, all frames are encoded as I-frames. Selected compressed frames are then sent to the decoder at the repetition rate. Thus, for example, if the repetition rate is one out of every ten frames, all ten frames will be compressed, but only one of each ten compressed frames will be sent to the decoder via the transport processor. The remaining frames are either not written into the compressed video buffer 20, overwritten in the video buffer, or dumped. In the embodiment illustrated in FIG. 1, the first option is implemented via the control signal input to gate 19, which only writes one of the ten frames into the buffer 20. It should be appreciated that the repetition rate described above is only an example, and that any ratio of transmitted frames to compressed frames can be used depending on the system requirements.

As noted above, as the input video is received, it is written into the current frame buffer 12 and video frames are selected by selector 16 at the frame capture rate. In between capture rate cycles, the video compressor receives frames to compress from the previous frame buffer 14 via the selector 16, which runs at the input frame rate so that the compression engine 17 is kept supplied with frames at its normal processing rate. The previous frame buffer simplifies the operation of the system and tracking of the frames, particularly if the capture and repetition rates are not the same.

Advantageously, the rate control algorithm of the compression engine does not have to be changed from its normal operation in order to practice the present invention. This algorithm merely uses the repetition rate for the required frame rate parameters. At the same time, the desired output bit rate is used for the required bit rate parameters. The purpose of the rate control algorithm is to maintain the number of output bits within an available bandwidth. Since the present invention only transmits frames at the low repetition rate, the rate control uses the repetition rate in calculating the necessary bandwidth parameters. The input rate to the compression engine (i.e., the input video frame rate) does not matter for purposes of the rate control algorithm.

Frames are inserted into the MPEG-2 transport by the transport processor 22. The PTS/DTS is set such that, for example, 1.5 frames are stored in the decoder video buffer (e.g., a video FIFO) before the PTS/DTS time. This provides enough buffer time to ensure that a complete frame has entered the decoder video FIFO before the decoder is required to process that frame.

Figure 2:
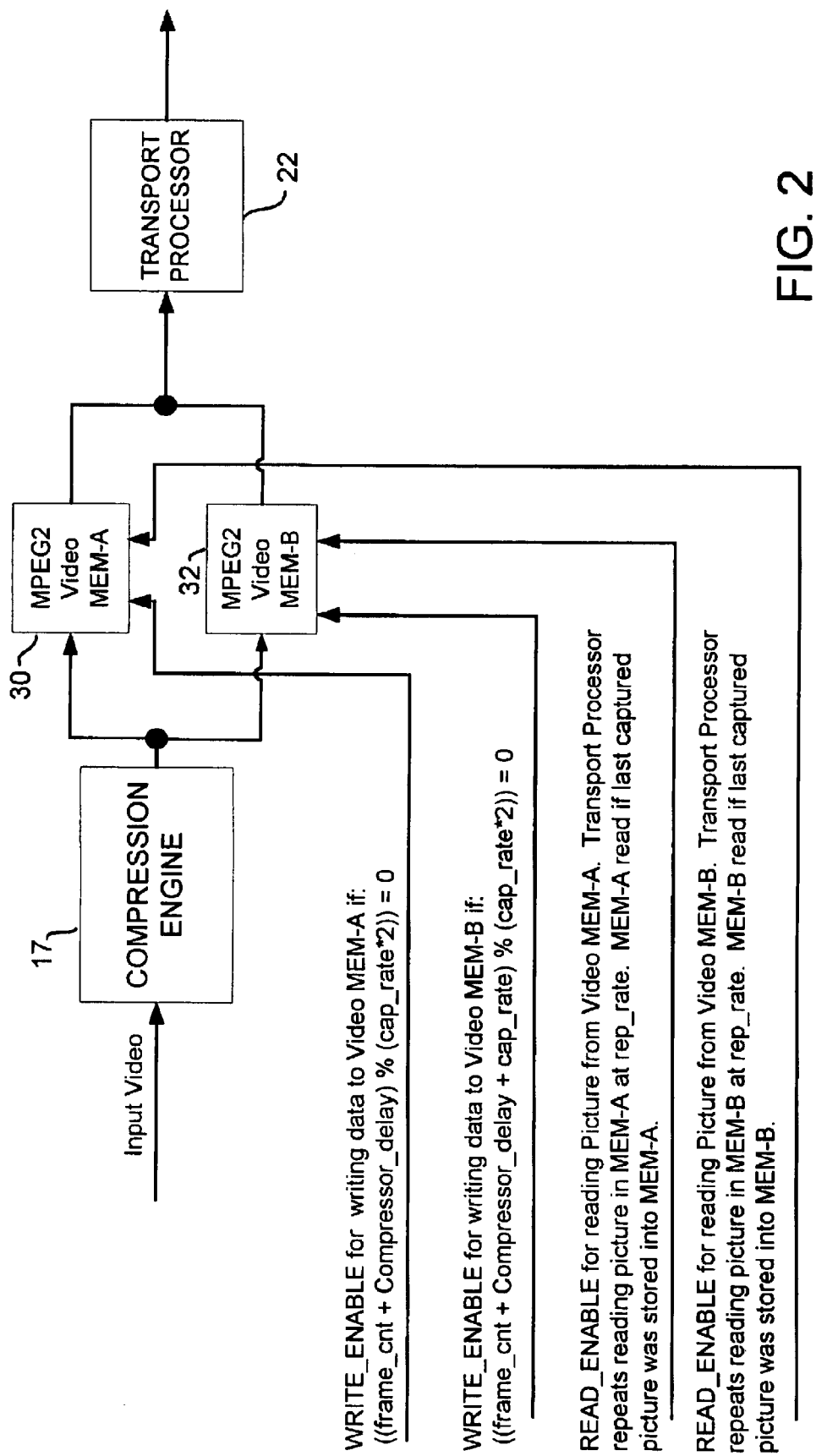
FIG. 2 is a block diagram illustrating an alternate embodiment of a still picture encoder in accordance with the invention.

FIG. 2 illustrates an alternative embodiment of the invention which does not require the selector 16 or the current and previous frame buffers 12 and 14, respectively. In this embodiment, raw video (the "input video") is provided to the compression engine 17 at the video frame rate of, e.g., 30 or 29.97 frames per second. The compression engine encodes all of the frames it receives. Those frames that are to be stored in the video memory 30, 32 for subsequent transmission to the decoders (via transport processor 22) are encoded as I-frames. For simplicity, all of the frames received by the compression engine may be coded as I-frames. The video memory is a type which has a controllable read pointer, which can be reset to the beginning of a picture. In this manner, the same picture can be re-read from the memory several times.

Upon initialization, the first picture to be captured from the input video is written into MEM-A 30. The next captured picture will be written into MEM-B 32. The memory used for picture storage toggles for each captured picture. The pictures must be double buffered in this manner, so that the transport processor 22 can read from one memory bank (30 or 32), while the compression engine 17 is writing into the other memory bank. It should be appreciated that instead of the two separate memories 30, 32 illustrated, one circular memory buffer with two read and two write pointers can be used. Such a circular buffer should be large enough to handle worst case conditions to avoid overwriting data before it is read.

Also at initialization, the transport processor 22 reads data from MEM-A 30 when the first picture is available. The transport processor reads data at the output bit rate. After the first picture has been read out, the transport processor will wait for the still picture repetition rate (rep_rate) period to expire. The rep_rate period starts at the time the first picture is read. When the rep_rate period expires, the transport processor reads that same picture again from MEM-A 30. This is repeated until a new captured picture is stored into MEM-B 32. After a new picture is stored in MEM-B, the transport processor commences reading from MEM-B when the current rep_rate period expires. Reading of the new picture continues from MEM-B according to the same procedure noted above, until the next new captured picture is stored into MEM-A. In the event that a new rep_rate period occurs before the transport processor finishes reading the current picture, the transport processor immediately starts reading the same picture again, or starts reading the picture in the other memory (MEM-A or MEM-B) if a new capture frame has arrived. Thus, it can be seen that still frame pictures are continuously provided at the still picture repetition rate from MEM-A and MEM-B in a cyclical manner, where the cycles depend on the rate at which new pictures are captured from the output of the compression engine.

It should now be appreciated that the present invention provides for the encoding and transmission of still picture images at a reduced frame rate and reduced transmission rate. Such a scheme is particularly useful for applications that do not require lots of data to be delivered continuously, such as weather information and text information identifying content that is delivered via a digital decoder. Such content can comprise, for example, multimedia presentations, music, or the like.

Various alternative implementations of the invention can be practiced. In one alternate embodiment, the transport processor 22 can request I-frames from the video compressor, instead of being automatically provided with such frames by the compressed video buffer 20. In such an embodiment, the compression engine will produce the I-frame at a specified time. The transport processor will wait until the I-frame is encoded, and request that it be stored in a video buffer.

In another alternate embodiment, the compressor can produce all I-frames (as described in connection with the illustrated embodiment) and store them in the compressed video buffer. The transport processor then dumps the unused compressed still picture frames and transmits the desired frame at the still picture repetition rate. The frame transmitted can be selected in either of two ways. These are: 1) the compressor can 'tag' that frame when it is captured at the capture rate; the transport processor will then transmit the tagged frames; or 2) the transport processor can select the frames at the capture rate (i.e., the transport processor reads the compressed video buffer data and counts frames).

An advantage of the embodiment just described is that there is no need to provide a gate 19 at the input or output side of the video buffer 20. However, the transport processor must be redesigned for this embodiment, and a large compressed video buffer is required to hold the I-frames.

Although the invention has been described in connection with various preferred embodiments, it should be appreciated that various modifications and adaptations may be made thereto without departing from the scope of the invention as set forth in the claims.

What is claimed is:

1. A method for encoding and transmitting still picture images comprising:
   receiving video frames at an input frame rate;
   capturing ones of said video frames at a still picture capture rate which is less than the input frame rate;
   providing the captured video frames to a video compressor at the input frame rate, wherein an already captured video frame is repeatedly provided to said video compressor at the input frame rate until a new frame is captured; and
   transmitting the captured video frames after compression by said video compressor at a still picture repetition rate that is no less than said capture rate.

2. A method in accordance with claim 1 wherein said input frame rate is about 30 frames per second.

3. A method in accordance with claim 1 wherein said still picture repetition rate is within a range of about 1/30 to two frames per second.

4. A method in accordance with claim 3 wherein said still picture repetition rate is no greater than about 1/15 frames per second.

5. A method in accordance with claim 4 wherein said input frame rate is about 30 frames per second.

6. A method in accordance with claim 1 wherein said video compressor compresses all of the captured frames as I-frames.

7. A method in accordance with claim 1 wherein:
   compressed captured video frames to be transmitted are gated from the video compressor to a buffer in accordance with the frame repetition rate; and
   the frames are provided as output from said buffer for transmission at the frame repetition rate.

8. A method in accordance with claim 7 wherein only selected ones of the compressed captured video frames are gated into said buffer for transmission.

9. A method in accordance with claim 1 wherein the compressed, captured video frames are transmitted at a bit rate on the order of 100 Kbps to 200 Kbps.

10. Apparatus for encoding and transmitting still picture images comprising:
    a selector adapted to receive video frames at an input frame rate and capture a subset of the video frames at a still picture capture rate which is less than the input frame rate;
    a video compressor coupled to receive and compress the captured video frames at the input frame rate, wherein an already captured video frame is repeatedly provided to said video compressor at the input frame rate until a new frame is captured; and
    a buffer coupled to receive the captured video frames after compression by said video compressor for subsequent transmission at a still picture repetition rate that is no less than said capture rate.

11. Apparatus in accordance with claim 10, further comprising:
    a current frame buffer coupled to store the video frames prior to capture thereof by said selector; and
    a previous frame buffer coupled to store the video frames captured by the selector.

12. Apparatus in accordance with claim 11 wherein said selector captures a current video frame from said current frame buffer, and subsequently repeatedly provides that frame from the previous frame buffer as input to the video compressor until a next current frame is captured at the still picture capture rate.

13. Apparatus in accordance with claim 10 wherein said video compressor compresses all of the captured frames as I-frames.

14. Apparatus in accordance with claim 10 further comprising a gate between said video compressor and said buffer, said gate being adapted to provide selected ones of the compressed video frames to the buffer in accordance with said still picture repetition rate.

15. A method for encoding and transmitting still picture images comprising:
    compressing video frames at an input frame rate;
    capturing ones of said compressed video frames at a still picture capture rate which is less than the input frame rate; and
    providing the captured video frames for transmission at a still picture repetition rate that is no less than said capture rate;
    wherein if the still picture repetition rate is greater than the capture rate, an already captured video frame is repeatedly provided for transmission at the still picture repetition rate until a new frame is captured.

16. A method in accordance with claim 15 wherein alternate captured video frames are stored in alternate memories, such that:
    a first captured video frame can be repeatedly provided for transmission from a first memory at the still picture repetition rate while a second memory awaits storage of a second captured video frame, and
    the second captured video frame can be repeatedly provided for transmission from said second memory at the still picture repetition rate while said first memory awaits storage of a subsequent captured video frame.

17. A method in accordance with claim 15 wherein said input frame rate is about 30 frames per second.

18. A method in accordance with claim 15 wherein said still picture repetition rate is within a range of about 1/30 to two frames per second.

19. A method in accordance with claim 18 wherein said still picture repetition rate is no less than about 1/15 frames per second.

20. A method in accordance with claim 19 wherein said input frame rate is about 30 frames per second.

21. A method in accordance with claim 15 wherein said video compressor compresses all of the captured frames as I-frames.

22. A method in accordance with claim 15 wherein the compressed, captured video frames are transmitted at a bit rate on the order of 100 Kbps to 200 Kbps.

23. Apparatus for encoding and transmitting still picture images comprising:
- a video compressor coupled to receive and compress video frames at an input frame rate;
- at least one memory coupled to store ones of said compressed video frames at a still picture capture rate which is less than the input frame rate;
- said at least one memory being adapted to provide the stored video frames for transmission at a still picture repetition rate that is no less than said capture rate;
- wherein if the still picture repetition rate is greater than the capture rate, an already stored video frame is repeatedly provided from the memory for transmission at the still picture repetition rate until a new frame is stored.

24. Apparatus in accordance with claim 23 wherein said at least one memory comprises:
- first and second memories coupled to receive compressed video frames from said video compressor;
- said first memory being responsive to a first write enable control input to store a first compressed video frame in accordance with said still picture capture rate, and being responsive to a first read enable control input to provide the first compressed video frame as output in accordance with said still picture repetition rate; and
- said second memory being responsive to a second write enable control input to store a second compressed video frame in accordance with said still picture capture rate, and being responsive to a second read enable control input to provide the second compressed video frame as output in accordance with said still picture repetition rate.

25. Apparatus in accordance with claim 24 wherein said write enable and read enable control inputs control said first memory to store a video frame while a previous video frame is being read from said second memory, and vice-versa.

26. Apparatus in accordance with claim 23 wherein said video compressor compresses all of the received frames as I-frames.

* * * * *